(12) United States Patent
Yoshida

(10) Patent No.: US 10,168,535 B2
(45) Date of Patent: Jan. 1, 2019

(54) OPTICAL ELEMENT AND DISPLAY DEVICE

(71) Applicant: SEIKO EPSON CORPORATION, Tokyo (JP)

(72) Inventor: Shohei Yoshida, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/703,495

(22) Filed: Sep. 13, 2017

(65) Prior Publication Data

US 2018/0088338 A1 Mar. 29, 2018

(30) Foreign Application Priority Data

Sep. 28, 2016 (JP) .................................. 2016-189249

(51) Int. Cl.
*G02B 27/01* (2006.01)
*F21V 8/00* (2006.01)

(52) U.S. Cl.
CPC .......... *G02B 27/0172* (2013.01); *G02B 6/002* (2013.01); *G02B 6/003* (2013.01); *G02B 6/0055* (2013.01); *G02B 2027/0125* (2013.01); *G02B 2027/0178* (2013.01)

(58) Field of Classification Search
CPC .... G02B 27/0172; G02B 6/002; G02B 6/003; G02B 6/0055; G02B 2027/0125; G02B 2027/0178
USPC ........................................................ 359/630
See application file for complete search history.

(56) References Cited

U.S. PATENT DOCUMENTS

| 8,433,172 | B2 * | 4/2013 | Pascal | G02B 27/0172 |
| | | | | 359/630 |
| 8,503,087 | B1 * | 8/2013 | Amirparviz | G02B 5/09 |
| | | | | 359/630 |
| 8,662,686 | B2 * | 3/2014 | Takagi | G02B 27/0172 |
| | | | | 359/633 |
| 8,665,178 | B1 * | 3/2014 | Wang | G02B 27/0172 |
| | | | | 345/7 |
| 9,057,826 | B2 * | 6/2015 | Gupta | G02B 3/12 |

(Continued)

FOREIGN PATENT DOCUMENTS

| JP | 2011-509417 A | 3/2011 |
| JP | 5817904 B1 | 11/2015 |

(Continued)

*Primary Examiner* — Collin X Beatty
(74) *Attorney, Agent, or Firm* — Oliff PLC

(57) ABSTRACT

An optical element includes a plurality of mirrors; a first transmittance member interposed between adjacent two mirrors; and a second transmittance member provided on one of an incidence and an exit side of the image and the external image with respect to the first transmittance member. A surface of one transmittance member opposite to the other transmittance member among the first and the second transmittance member is an incidence surface on which the image and the external image are incident via a light guiding body. A surface of the other transmittance member is an exit surface from which the image and the external image are exited. Each of the plurality of mirrors is disposed so as to be inclined with respect to the incidence surface. The plurality of mirrors include a first and a second mirror whose width is narrower than a width of the first mirror.

20 Claims, 12 Drawing Sheets

(56) References Cited

U.S. PATENT DOCUMENTS

| | | | |
|---|---|---|---|
| 9,442,291 B1* | 9/2016 | Martinez | G02B 27/0172 |
| 9,632,312 B1* | 4/2017 | Cakmakci | G02B 5/1852 |
| 2013/0163089 A1* | 6/2013 | Bohn | G02B 27/0172 |
| | | | 359/630 |
| 2013/0229712 A1* | 9/2013 | Kress | G02B 27/0172 |
| | | | 359/572 |
| 2017/0038834 A1* | 2/2017 | Wilson | G06T 7/215 |

FOREIGN PATENT DOCUMENTS

| | | |
|---|---|---|
| JP | 5843043 B1 | 1/2016 |
| JP | 2016-042136 A | 3/2016 |
| JP | 2017-003845 A | 1/2017 |
| WO | 2009-074638 A2 | 6/2009 |
| WO | 2016/027442 A1 | 2/2016 |
| WO | 2016-088389 A1 | 6/2016 |

* cited by examiner

OPTICAL ELEMENT AND DISPLAY DEVICE

BACKGROUND

1. Technical Field

The present disclosure relates to an optical element and a display device.

2. Related Art

Recently, an image display device of a type used by being worn on the head of an observer such as a head-mounted display is provided as one of wearable information devices. There is also known an image display device capable of recognizing simultaneously and visually both an image generated by a display element and an external image when the observer wears the image display device, that is, a so-called see-through type image display device.

JP-A-2016-42136 discloses a light guiding device that includes a parallel light guiding body, an incidence portion, and an exit portion, and the exit portion includes a reflection unit in which a plurality of partially reflecting mirrors for reflecting image light are arranged in parallel with each other, and guides light from an image element in a display device such as a head-mounted display to a viewing field of an observer. In addition, JP-A-2016-42136 discloses that a thickness of the reflection unit may be thick on a side close to the light incidence portion and may be thin on a side far from the incidence portion, and that total reflection mirrors may be used in a case where a pitch of a partially reflecting mirror is wide.

If a reflectance of the partially reflecting mirror increases in an exit portion having a plurality of partially reflecting mirrors, exit efficiency of image light increases. However, if the reflectance of the partially reflecting mirror is 100% in the light guiding device described in JP-A-2016-42136, a problem occurs in which a large dark portion is generated in an image. In addition, if an interval between the partially reflecting mirrors increases, the large dark portion can be decreased, but another problem occurs in which striped unevenness in brightness is generated.

In addition, since a thickness of the overall reflection unit changes from a side close to the light incidence portion to a side far from the light incidence portion, in the light guiding device described in JP-A-2016-42136, an incidence surface and an exit surface facing each other in the reflection unit are not parallel with each other. In addition, since the reflecting unit is buried in a parallel light guiding body, an inclined surface which is a boundary between the parallel light guiding body and the reflection unit exists between the incidence surface of external image of the parallel light guiding body and an exit surface of the reflection unit. In addition, an adhesive is interposed between the parallel light guiding body and the reflection unit. As such, if the inclined surface exists between the incidence surface and the exit surface of the external image, a light path of the external image is bent due to the difference in refractive index between the parallel light guiding body and the reflection unit, presence of the adhesive, or the like. As a result, problems such as enlargement of external images and focus shift occur.

SUMMARY

An advantage of some aspects of the embodiment is to provide a display device which can reduce a dark portion of an image and striped unevenness in brightness and can reduce enlargement of external image, focus shift, and the like. In addition, another advantage of some aspects of the embodiment is to provide an optical element which is optimally used for a light exit portion of the display device.

According to an aspect of the embodiment, there is provided an optical element including a plurality of mirrors that are provided in parallel to each other with an interval therebetween and reflect a part of image light and external image; a first transmittance member that is interposed between adjacent two mirrors of the plurality of mirrors; and a second transmittance member that is provided on one of an incidence side and an exit side of the image light and the external image with respect to the first transmittance member, in which a surface of one transmittance member opposite to the other transmittance member among the first transmittance member and the second transmittance member is an incidence surface on which the image light and the external image are incident via a light guiding body, in which a surface of the other transmittance member opposite to the one transmittance member is an exit surface from which the image light and the external image are exited to an observer side, in which each of the plurality of mirrors is disposed so as to be inclined with respect to the incidence surface, and in which the plurality of mirrors include a first mirror and a second mirror whose width is narrower than a width of the first mirror.

In the optical element according to the aspect of the embodiment, a plurality of mirrors include a first mirror and a second mirror having a width narrower than a width of the first mirror, and thereby, light which is incident on the mirror on a side close to the second mirror at a small incidence angle and is reflected at a small reflection angle is exited in a predetermined direction without being blocked by the second mirror. Thereby, it is possible to reduce a dark portion and striped brightness unevenness of an image.

In addition, since the optical element is provided with a second transmittance member provided on one of the incidence side and an exit side of an image light and an external image with respect to the first transmittance member, although a light path of the external image is bent while the external image passes through each member, bending of the light path can be reduced by being compensated for by the second transmittance member. Thereby, it is possible to reduce enlargement of an external image, focus shift, and the like.

In the optical element according to the aspect of the embodiment, widths of the plurality of mirrors that belong to at least a part of an entire region which is provided with the plurality of mirrors may be sequentially narrowed from a side on which the first mirror is disposed toward a side on which the second mirror is disposed.

According to the configuration, it is possible to reduce a dark portion and striped brightness unevenness of an image and to obtain a gentle intensity distribution.

In the optical element according to the aspect of the embodiment, the second transmittance member may be provided on an exit side of the image light and the external image with respect to the first transmittance member, and one end of each of the plurality of mirrors may be in contact with the incidence surface.

According to the configuration, it is possible to increase exit efficiency of image light.

In the optical element according to the aspect of the embodiment, the second transmittance member may be provided on an incidence side of the image light and the external image with respect to the first transmittance member, and one end of each of the plurality of mirrors may be in contact with the exit surface.

According to the configuration, it is possible to increase uniformity of brightness of an image.

In the optical element according to the aspect of the embodiment, the first transmittance member may be integrally formed with the second transmittance member.

According to the configuration, a boundary between a first transmittance member and a second transmittance member is removed, and thereby, it is possible to remove bending of a light path in the boundary.

In the optical element according to the aspect of the embodiment, the first transmittance member may be separately formed from the second transmittance member.

According to the configuration, the first transmittance member and the second transmittance member can be individually produced, and thereby, the optical element can be easily manufactured. Particularly, the second transmittance member can be easily produced, and thereby, bending of a light path of external image is easily compensated for.

In the optical element according to the aspect of the embodiment, the first transmittance member may have the same refractive index as the second transmittance member, and the exit surface may be parallel to the incidence surface.

According to the configuration, it is possible to substantially remove bending of a light path of external image in a boundary between a first transmittance member and a second transmittance member, and to make the light path of the external image before being incident on the optical element and the light path of the external image after being exited from the optical element parallel to each other.

In the optical element according to the aspect of the embodiment, the first transmittance member may have different refractive index from the second transmittance member, and the exit surface may be inclined with respect to the incidence surface.

According to the configuration, although a light path of external image is bent in a boundary between a first transmittance member and a second transmittance member, an inclination angle of an exit surface with respect to an incidence surface can be appropriately adjusted, and thereby, it is possible to appropriately compensate for the bending of the light path.

In the optical element according to the aspect of the embodiment, a reflectance of each of the plurality of mirrors may be higher than or equal to 60% and is lower than 100%.

According to the configuration, it is possible to increase exit efficiency of light more than that of an optical element in the related art.

In the optical element according to the aspect of the embodiment, each of the plurality of mirrors may be formed of a metal material.

According to the configuration, it is possible to easily realize a mirror with a reflectance higher than or equal to 60% and lower than 100%.

In the optical element according to the aspect of the embodiment, a width of the second mirror may be smaller than a pitch between a mirror adjacent to the second mirror and the second mirror.

According to the configuration, it is possible to make external image sufficiently pass through and to secure brightness of an external image.

According to another aspect of the embodiment, there is provided a display device including an image forming device; and a light guiding device that guides image light that is generated by the image forming device. The light guiding device includes an incidence portion on which the image light is incident, a light guiding body that guides the image light which is incident from the incidence portion, and an exit portion from which the image light is exited. The exit portion includes the optical element according to an aspect of the embodiment.

The display device according to the aspect of the embodiment includes an exit portion having the optical element according to the aspect of the embodiment, and thereby, it is possible to realize a display device capable of reducing a dark portion and striped brightness unevenness of an image.

In the display device according to the aspect of the embodiment, the exit portion may be provided on a surface on a viewing side of the light guiding body.

According to the configuration, it is possible to realize a display device whose optical design can be easily made.

In the display device according to the aspect of the embodiment, each of the plurality of mirrors may be inclined such that an end portion of the incidence side approaches the incidence portion side of the light guiding device.

According to the configuration, image light is incident on a mirror close to an incidence portion side at a large incidence angle and is reflected, and the image light is incident on a mirror far from the incidence portion side at a relatively small incidence angle and is reflected, and thereby, it is possible to make the image light advance in a direction of the eyes of an observer.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Hereinafter, an embodiment will be described with reference to the drawings.

A display device according to the present embodiment is used as, for example, a head-mounted display used by being worn on the head of an observer.

Figure 1:
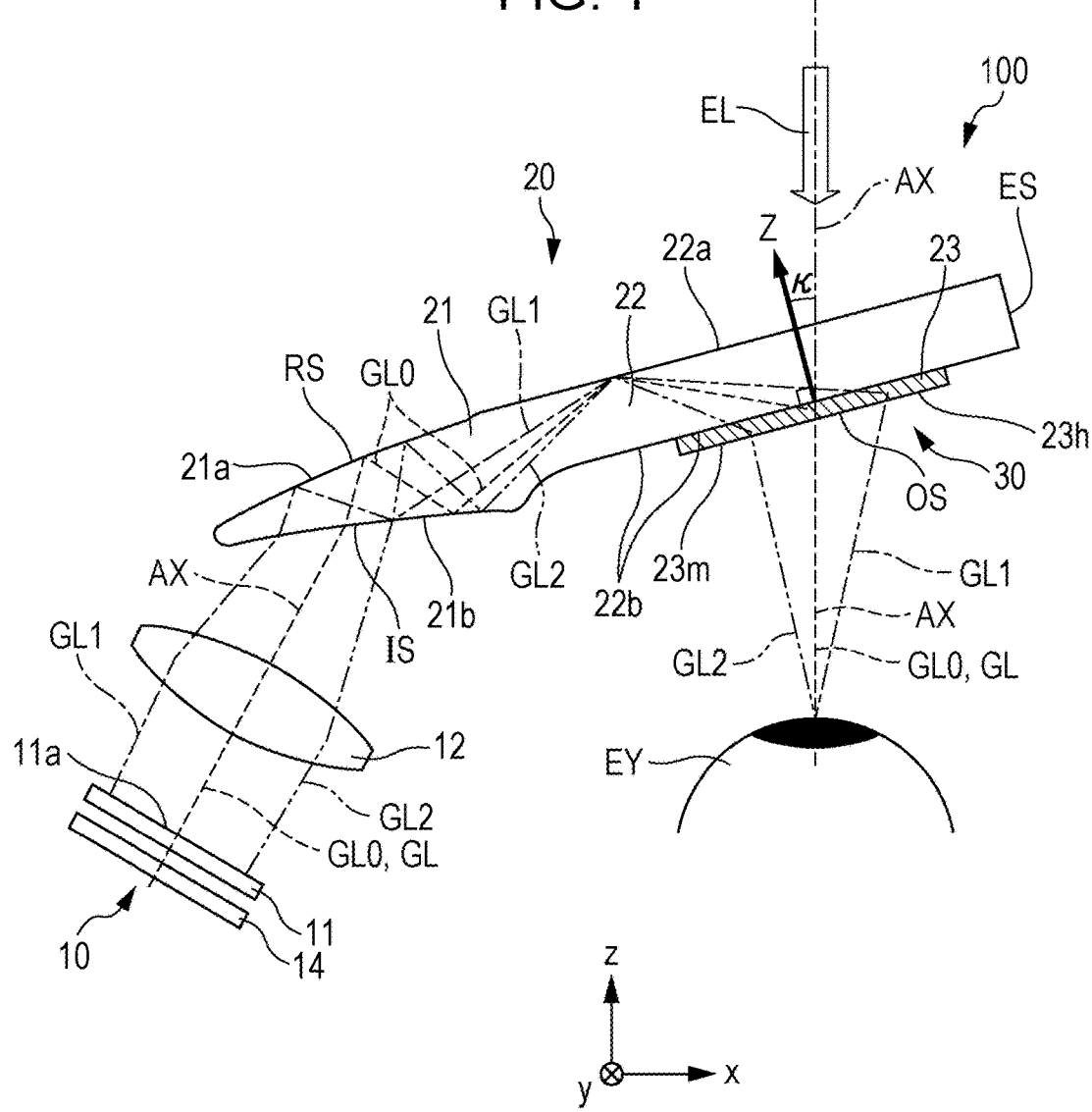
FIG. 1 is a plan view of a display device according to a first embodiment.
Figure 2:
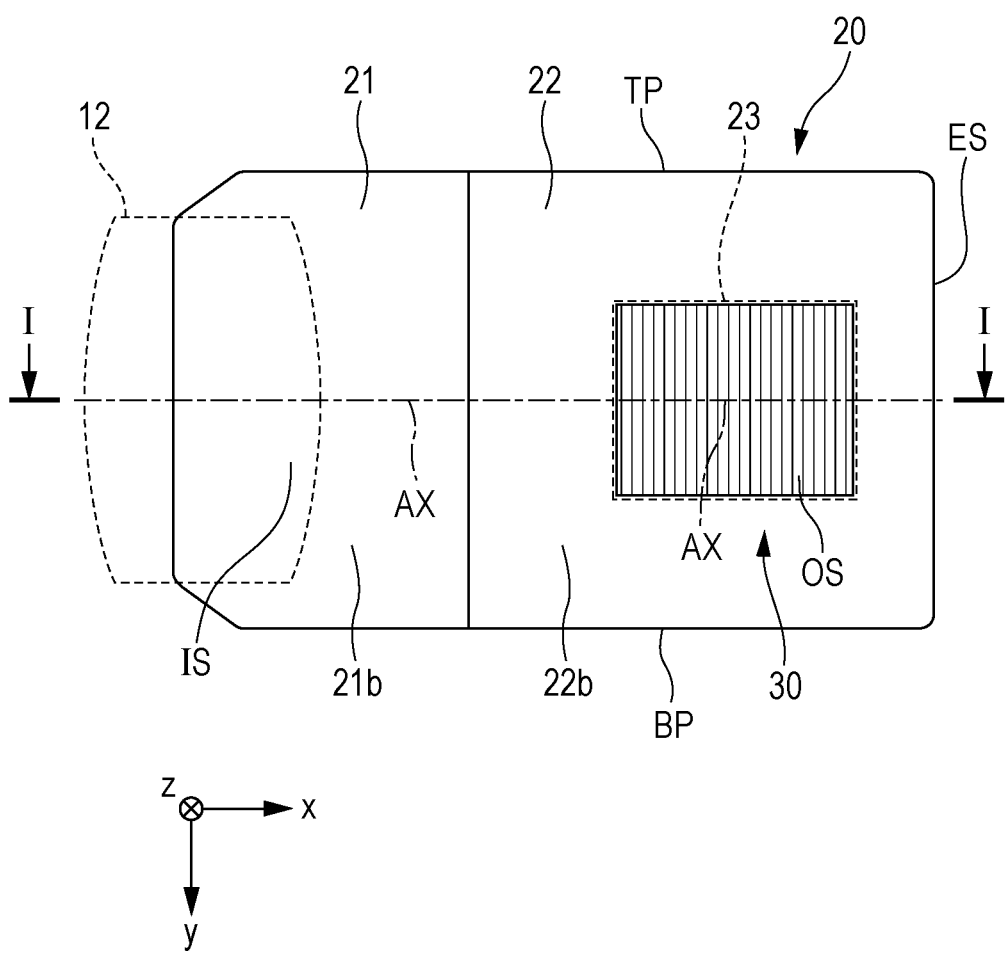
FIG. 2 is a rear view of a light guiding device viewed from an observer side.
Figure 3:
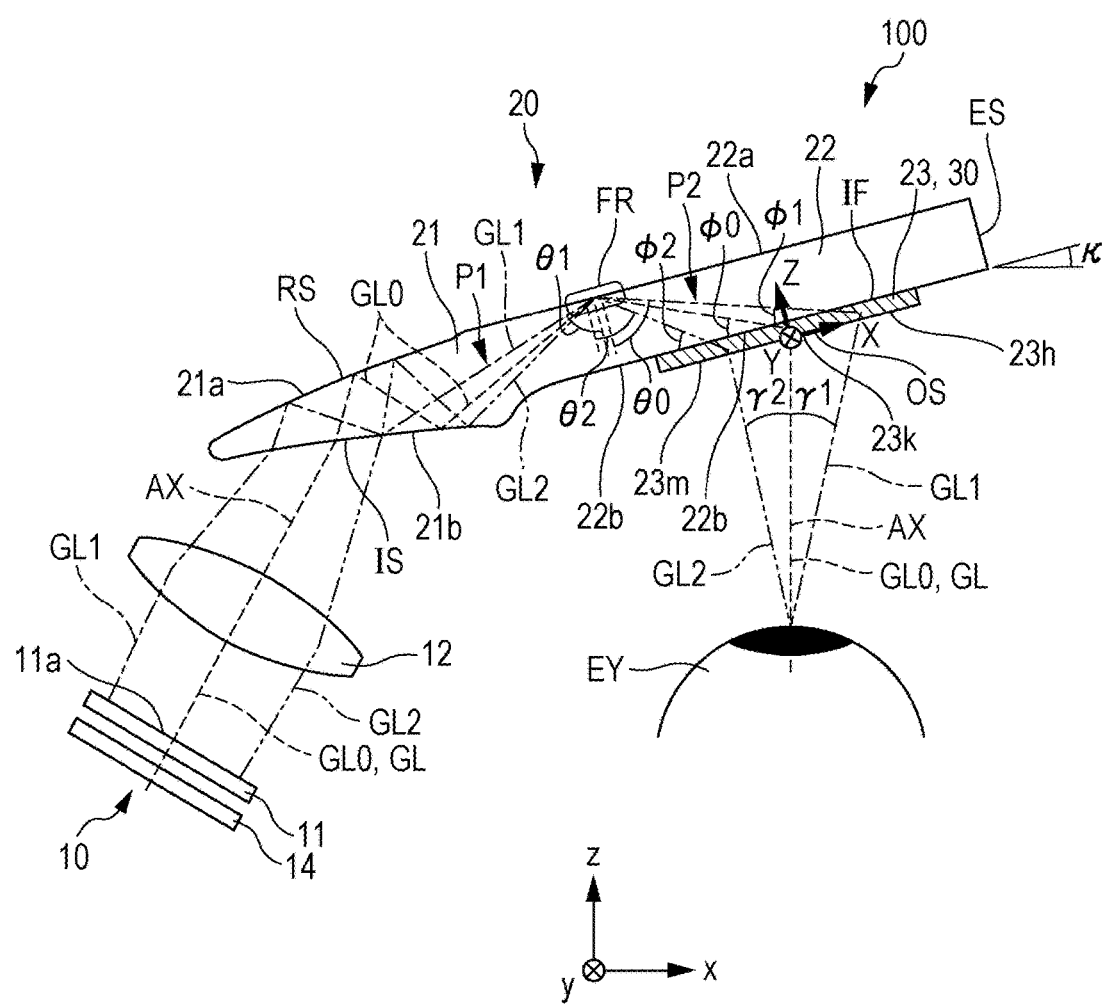
FIG. 3 is a view illustrating a light path of image light in the light guiding device.

FIG. 1 is a plan view of the display device according to the embodiment. FIG. 2 is a rear view of a light guiding device viewed from an observer side. FIG. 3 is a view illustrating a light path of image light in the light guiding device.

In the following drawings, scales of dimensions may be changed by configuration elements so as to make each configuration element be easily viewed.

Overall Configuration of Light Guiding Device and Display Device

As illustrated in FIG. 1, the display device 100 includes an image forming device 10 and a light guiding device 20. FIG. 1 corresponds to a cross section I-I of the light guiding device 20 illustrated in FIG. 2.

The display device 100 allows the observer to view an image formed by the image forming device 10 as a virtual image and allows an observer to observe an external image in a see-through manner. The display device 100 includes the image forming device 10 and the light guiding device 20 which are provided by one pair in correspondence with the right eye and the left eye of the observer. A device for the right eye and a device for the left eye are the same in configuration, and are different only in a point where each configuration element is bilaterally symmetrical in disposition. Accordingly, only the portion for the left eye is illustrated, and illustration of the portion for the right eye is omitted here. The display device 100 has an appearance like, for example, eyeglasses as a whole.

The image forming device 10 includes an organic electroluminescence (EL) element 11 and a projection lens 12. The organic EL element 11 exits image light GL forming an image such as a moving image and a still image. The image forming device is not limited to the organic EL element 11, and may use an image forming device including a liquid crystal element and the like. The projection lens 12 is configured with a collimator lens which converts the image light GL exited from each point on the organic EL element 11 into substantially parallel rays. The projection lens 12 is formed of glass or plastic, and is not limited to one piece, and may be configured with a plurality of lenses. The projection lens 12 is not limited to a spherical lens, and may be an aspherical lens, a free curved surface lens, or the like.

The light guiding device 20 is configured with a light-transmittance member of a flat shape. The light guiding device 20 guides the image light GL generated by the image forming device 10 and then exits the light toward the eye EY of an observer, while transmitting external image EL forming the external image. The light guiding device 20 includes an incidence portion 21 on which image light is incident, a parallel light guiding body 22 that mainly guides the image light, and an exit portion 23 that exits the image light GL and the external image EL. The parallel light guiding body 22 and the incidence portion 21 are integrally formed of a resin material with high light transmittance. In the present embodiment, the light path of the image light GL propagating through the light guiding device 20 is configured with a light path of one type that reflects light in the same number of times, and may not be a combination of a plurality of types of light paths.

The parallel light guiding body 22 is disposed to be inclined with respect to the light axis AX which uses a visual line as a reference when the eye EY of the observer looks at the front. A normal direction Z of a flat surface 22a of the parallel light guiding body 22 is inclined by an angle κ with respect to the light axis AX. Thereby, the parallel light guiding body 22 can be disposed along a front face of the face of the observer, and a normal line of the flat surface 22a of the parallel light guiding body 22 is inclined with respect to the light axis AX. As such, By inclining the normal line of the flat surface 22a of the parallel light guiding body 22 is inclined by the angle κ with respect to the z direction parallel to the light axis AX, the image light GL0 on and around the light axis AX which is exited from the optical element 30 forms an angle κ with respect to the normal line of the light exit surface OS.

A direction parallel to the light axis AX is referred to as the z direction, and among the flat surfaces perpendicular to the z direction, the horizontal direction is referred to as the x direction and the vertical direction is referred to as the y direction.

The incidence portion 21 includes a light incident surface IS and a reflection surface RS. The image light GL from the image forming device 10 enters the incidence portion 21 via the light incident surface IS. The image light GL taken into the incidence portion 21 is reflected by the reflection surface RS and is guided to the inside of the parallel light guiding body 22. The light incident surface IS is configured by a curved surface 21b that is a concave as viewed from the projection lens 12. The curved surface 21b also has a function of totally reflecting the image light GL reflected by the reflection surface RS on the inner surface side.

The reflection surface RS is configured with a curved surface 21a that is a concave as viewed from the projection lens 12. The reflection surface RS is formed of a metal film such as an aluminum film formed on the curved surface 21a by an evaporation method or the like. The reflection surface RS reflects the image light GL incident from the light incident surface IS and bends the light path. The curved surface 21b totally reflects the image light GL reflected by the reflection surface RS on the inner side and bends the light path. As such, the incidence portion 21 reflects the image light GL incident from the light incident surface IS twice and bends the light path, thereby reliably guiding the image light GL to the inside of the parallel light guiding body 22.

The parallel light guiding body 22 is a light guiding member of a flat shape parallel to the y axis and inclined with respect to the z axis. The parallel light guiding body (light guiding body) 22 is formed of a resin material and the like with light transmittance, and includes a pair of flat surfaces 22a and 22b substantially parallel to each other. Since the flat surfaces 22a and 22b are parallel flat surfaces, enlargement and focus shift of an external image are not made. The flat surface 22a functions as a total reflection surface that totally reflects the image light from the incidence portion 21, and guides the image light GL to the exit portion 23 with a small loss. The flat surface 22a is disposed on an external side of the parallel light guiding body 22 and functions as a first total reflection surface, and is also referred to as an external side surface in the specification.

The flat surface 22b is also referred to as an observer side surface in the specification. The flat surface 22b (observer side surface) extends to one end of the exit portion 23. Here, the flat surface 22b is a boundary IF between the parallel light guiding body 22 and the exit portion 23 (refer to FIG. 3).

In the parallel light guiding body 22, the image light GL reflected by the reflection surface RS or the light incident surface IS of the incidence portion 21 is incident on the flat surface 22a which is a total reflection surface, is totally reflected by the flat surface 22a, and is guided to a +x side or an X side on which a far side of the light guiding device 20, that is, the exit portion 23 is provided. As illustrated in FIG. 2, the parallel light guiding body 22 has a vertical end surface ES as a cross section of the +x side in an outer shape of the light guiding device 20. In addition, the parallel light guiding body 22 has an upper end surface TP and a lower end surface BP as cross sections on the ±y side.

A normal of the flat surface 22b is referred to as the Z direction, and among the surfaces perpendicular to the Z direction, the horizontal direction is referred to as the X direction and the vertical direction is referred to as the Y direction.

As illustrated in FIG. 3, the exit portion 23 is formed in a plate shape along the flat surface 22b or the boundary IF on the far side (+x side) of the parallel light guiding body 22. When the image light GL totally reflected by a region FR of the flat surface (total reflection surface) 22a on the external side of the parallel light guiding body 22 is allowed to pass through, the exit portion 23 reflects the incident image light GL at a predetermined angle and bends toward the light exit surface OS side. Here, the image light GL, which is first incident to the exit portion 23 without passing through the exit portion, is a target to be exited as virtual image light. That is, although there is light reflected by an inner surface of the light exit surface OS in the exit portion 23, the light is not used as image light.

The exit portion 23 includes an optical element 30 in which a plurality of mirrors 31 are arranged in one direction. A structure of the optical element 30 will be described in detail below with reference to FIG. 4 and the like. The optical element 30 is provided along the flat surface 22b of the parallel light guiding body 22 on the observer side.

Since the light guiding device 20 has the aforementioned structure, as illustrated in FIG. 3, a light path of the image light GL exited from the image forming device 10 and incident on the light guiding device 20 from the light incident surface IS is bent by multiple reflections caused by the incidence portion 21, and the image light is totally reflected in the region FR of the flat surface 22a of the parallel light guiding body 22 and proceeds substantially along the light axis AX. The image light GL reflected by the region FR of the flat surface 22a on the +z side is incident on the exit portion 23.

At this time, a width of the region FR in the longitudinal direction is narrower than a width of the exit portion 23 in the longitudinal direction, in an xy plane. That is, an incidence width in which a light ray of rays of the image light GL is incident on the exit portion 23 (or the optical element 30) is wider than an incidence width in which a light ray of the image light GL is incident on the region FR. As such, by relatively narrowing the incidence width in which a light ray of the image light GL is incident on the region FR, interference of the light path is less likely to occur, and the boundary IF is not used for guiding, that is, it is easy for the image light GL from the region FR to be directly incident on the exit portion 23 (or the optical element 30) without reflecting the image light GL at the boundary IF.

As the image light GL incident on the exit portion 23 is bent at an appropriate angle in the exit portion 23, the image light can be taken out, and is finally exited from the light exit surface OS. The image light GL exited from the light exit surface OS is incident on the eye EY of an observer as virtual image light. As the virtual image light forms an image on the retina of the observer, the observer can view the image light GL of the virtual image.

Here, an angle in which the image light GL used for image formation is incident on the exit portion 23 increases as the image light moves apart from the incidence portion 21 on the light source side. That is, the image light GL which is largely inclined with respect to the Z direction parallel to the flat surface 22a on the external side or the light axis AX is incident on the far side of the exit portion 23 and is bent at a relatively large angle, and the image light GL which is slightly inclined with respect to the Z direction or the light axis AX is incident on a close side of the exit portion 23 and is bent at a relatively small angle.

Light Path of Image Light

Hereinafter, the light path of the image light will be described in detail.

As illustrated in FIG. 3, components exited from a central portion of an exit surface 11a denoted by a dashed line, in the image light respectively exited from the exit surface 11a of the organic EL element 11, is defined as image light GL0, and components exited from the left side (−x and +z side) of a page, in the periphery of the exit surface 11a denoted by an alternate long and short dash line, is defined as image light GL1, and components exited from the right side (+x and −z side) of the page, in the periphery of the exit surface 11a denoted by a two point chain line, is defined as image light GL2. The light path of the image light GL0 among those is assumed to extend along the light axis AX.

Main components of the image lights GL0, GL1, and GL2 that pass through the projection lens 12 are respectively incident from the light incident surface IS of the light guiding device 20, and then proceeds to the exit portion 23 by passing through the inside of the parallel light guiding body 22 via the incidence portion 21. Specifically, the image light GL0 exited from the central portion of the exit surface 11a among the image lights GL0, GL1, and GL2 is bent by the incidence portion 21 and is coupled in the parallel light guiding body 22, and then, is incident on the region FR of the one flat surface 22a at a standard reflection angle θ0 and is totally reflected, passes through the boundary IF without being reflected by the boundary IF between the parallel light guiding body 22 and the exit portion 23 (or the optical element 30), and is directly incident on the central portion 23k of the exit portion 23. The image light GL0 is reflected at a predetermined angle in the portion 23k and is exited as parallel light flux in a direction (direction of an angle κ with respect to the Z direction) of the light axis AX inclined with respect to the XY plane including the light exit surface OS from the light exit surface OS.

The image light GL1 exited from one end side (−x side) of the exit surface 11a is bent by the incidence portion 21 and is coupled in the parallel light guiding body 22, and then, is incident on the region FR of the flat surface 22a at a maximum reflection angle θ1 and is totally reflected, passes through the boundary IF without being reflected by the boundary IF between the parallel light guiding body 22 and the exit portion 23 (or the optical element 30), is reflected at a predetermined angle in the portion 23h of the far side (+x side), in the exit portion 23, and is exited as a parallel light flux from the light exit surface OS at a predetermined angle direction. At this time, in an exit angle γ1, an angle returning to the incidence portion 21 side is relatively large.

Meanwhile, the image light GL2 exited from the other end side (+x side) of the exit surface 11a is bent by the incidence portion 21 and coupled in the parallel light guiding body 22, and then, is incident on the region FR of the flat surface 22a at a minimum reflection angle θ2 and is totally reflected, passes through the boundary IF without being reflected by the boundary IF between the parallel light guiding body 22 and the exit portion 23 (or the optical element 30), is reflected at a predetermined angle in a portion 23m of an entrance side (−x side) in the exit portion 23, and is exited as a parallel light flux from the light exit surface OS in a predetermined angular direction. At this time, in an exit angle γ2, an angle returning to the incidence portion 21 side is relatively small.

Although three ray components denoted by the image lights GL0, GL1, and GL2 are described as representative of a part of the overall rays of the image light GL, the other ray components configuring the image light GL are also guided in the same manner as ray components of the image light GL0 and the like, and are exited from the light exit surface OS. Accordingly, illustration and description of these will be omitted.

Here, a value of a critical angle θc is θc=45.6° on the assumption that n=1.4 as an example of a value of a refractive index n of a transparent resin material used for the incidence portion 21 and the parallel light guiding body 22. As the minimum reflection angle θ2 among the reflection angles θ0, θ1, and θ2 of the image lights GL0, GL1, and GL2 is set to a value larger than the critical angle θc, it is possible to satisfy total reflection conditions for necessary image light.

The image light GL0 directed to the center is incident on a portion 23k of the exit portion 23 at an elevation angle φ0(=90°−θ0). The image light GL1 directed to the periphery is incident on a portion 23h of the exit portion 23 at an elevation angle φ1(=90°−θ1). The image light GL2 directed to the periphery is incident on a portion 23m of the exit portion 23 at an elevation angle φ2(=90°−θ2). Here, a relationship of φ2>φ0>φ1 is established between the elevation angles φ0, φ1, and φ2, by reflecting a magnitude relationship of the reflection angles θ0, θ1, and θ2. That is, an incidence angle ι (refer to FIG. 4) on the mirror 31 of the optical element 30 gradually decreases in the order of the portion 23m corresponding to the elevation angle φ2, the portion 23k corresponding to the elevation angle φ0, and the portion 23h corresponding to the elevation angle φ1. In other words, the incidence angle ι on the mirror 31 or the reflection angle by the mirror 31 decreases as the light moves apart from the incidence portion 21.

An overall behavior of the light ray of the image light GL reflected by the flat surface 22a on the external side of the parallel light guiding body 22 toward the exit portion 23 will be described.

As illustrated in FIG. 3, the light ray of the image light GL has a width being narrowed in any one of straight light paths P1 and P2 before and after being reflected by the region FR on the external side of the parallel light guiding body 22, in a cross section including the light axis AX. Specifically, the light ray of the image light GL has a width being narrowed and a beam width being narrowed as a whole at a position which straddles the straight light paths P1 and P2 in the vicinity of the region FR, that is, in the vicinity of the boundary between the straight light paths P1 and P2, in a cross section including the light axis AX. Thereby, the light ray of the image light GL is narrowed in front of the exit portion 23, and a viewing angle in the lateral direction is widened relatively and easily. In the described example, the width is narrowed at a position where ray flux of the image light GL straddles the straight light paths P1 and P2 and thereby a beam width of the image light GL is narrowed, but the width may be narrowed only on one side of the straight light paths P1 and P2 and thereby the beam width may be narrowed.

Configuration of Optical Element

Hereinafter, a configuration of the optical element 30 configuring the exit portion 23 will be described.

Figure 4:
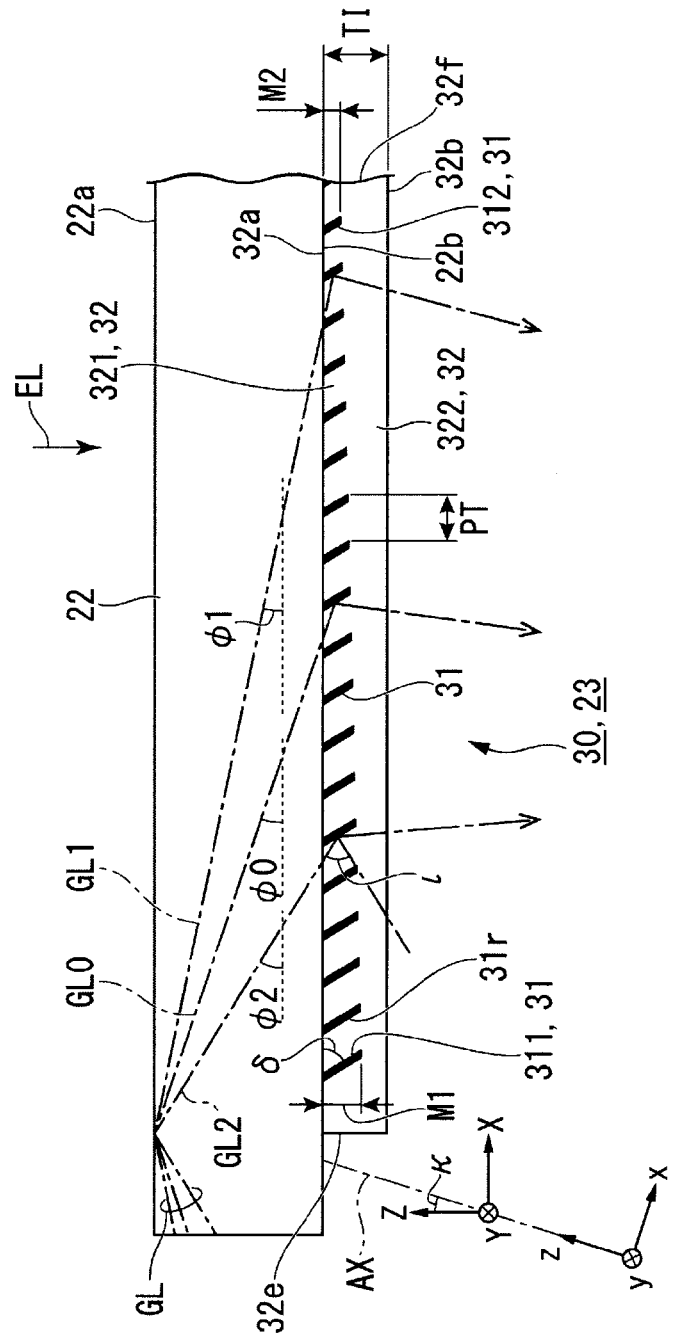
FIG. 4 is a sectional view of an optical element according to the first embodiment.

FIG. 4 is an enlarged view of the optical element 30 according to the present embodiment.

The exit portion 23 is configured by the optical element 30 provided on a viewing side surface of the parallel light guiding body 22. Therefore, the exit portion 23 is provided along the XY plane inclined by an angle κ with respect to the light axis AX in the same manner as the parallel light guiding body 22.

As illustrated in FIG. 4, the optical element 30 includes the plurality of mirrors 31 and a transmittance member 32. The plurality of mirrors 31 are provided in parallel to each other with an interval therebetween, and reflect a part of the image light GL and the external image EL. The transmittance member 32 includes a first transmittance member 321, and a second transmittance member 322.

In the present embodiment, the first transmittance member 321 is integrally formed with the second transmittance member 322. The first transmittance member 321 is interposed between adjacent two mirrors 31 of the plurality of mirrors 31. The second transmittance member 322 is provided on an exit side of the image light GL and the external image EL with respect to the first transmittance member 321. That is, the second transmittance member 322 is provided so as to cover the lower ends of the plurality of mirrors 31.

The transmittance member 32 is a plate-shaped member having a sectional shape of a rectangular shape. Therefore, the transmittance member 32 has a pair of flat surfaces which extend in parallel to the XY plane and are parallel to each other. Among the pair of flat surfaces, one surface is an incidence surface 32a on which the image light GL and the external image EL are incident, and the other flat surface is an exit surface 32b from which the image light GL and the external image EL are exited. The first transmittance member 321 includes the incidence surface 32a on which the image light GL and the external image EL are incident via the parallel light guiding body 22. The second transmittance member 322 includes the exit surface 32b from which the image light GL and the external image EL are exited toward an observer side.

That is, a surface, which is opposite to the other transmittance member (second transmittance member 322), of one transmittance member (first transmittance member 321) among the first transmittance member 321 and the second transmittance member 322, is the incidence surface 32a on which the image light GL and the external image EL are incident through the parallel light guiding body 22. In addition, a surface, which is opposite to one transmittance member (first transmittance member 321), of the other transmittance member (second transmittance member 322), is the exit surface 32b from which the image light GL and the external image EL are exited to the observer side.

The first transmittance member 321 has the same refractive index as that of the second transmittance member 322. In addition, the exit surface 32b is parallel to the incidence surface 32a. The transmittance member 32 is formed of, for example, a transparent resin, glass, or the like.

If the optical element 30 is viewed from a normal direction of the incidence surface 32a or the exit surface 32b of the transmittance member 32, the optical element has a structure in which a plurality of thin band-shaped mirrors 31 are arranged in a stripe shape. That is, the optical element 30 has a configuration in which a plurality of mirrors 31 of a rectangular shape are arranged in an extending direction of the parallel light guiding body 22, that is, in the X direction at a predetermined interval (pitch PT).

The mirror 31 is formed of a reflective film provided inside the transmittance member 32. The reflective film is formed of a metal material such as silver (Ag), aluminum (Al), chromium (Cr), or the like. Alternatively, the reflective film may be formed of a dielectric multilayer film in which plural kinds of dielectrics with different refractive indices are laminated. Each of the plurality of mirrors 31 is inclined such that an end portion on the incidence surface 32a of the mirror 31 faces the incidence portion 21 side of the light guiding device 20. More specifically, the mirror 31 is inclined such that the reflection surface 31r faces the incidence portion 21 side toward an external side of the parallel light guiding body 22. That is, the mirror 31 is inclined in a direction in which an upper end (+Z side) rotates in a counterclockwise direction with respect to the YZ plane orthogonal to the flat surfaces 22a and 22b by using a long side (Y direction) of the mirror 31 as an axis. Each of the plurality of mirrors 31 is inclined in a direction in which the end portion on the incidence surface 32a side approaches the incidence portion 21 side of the light guiding device 20.

Figure 5:
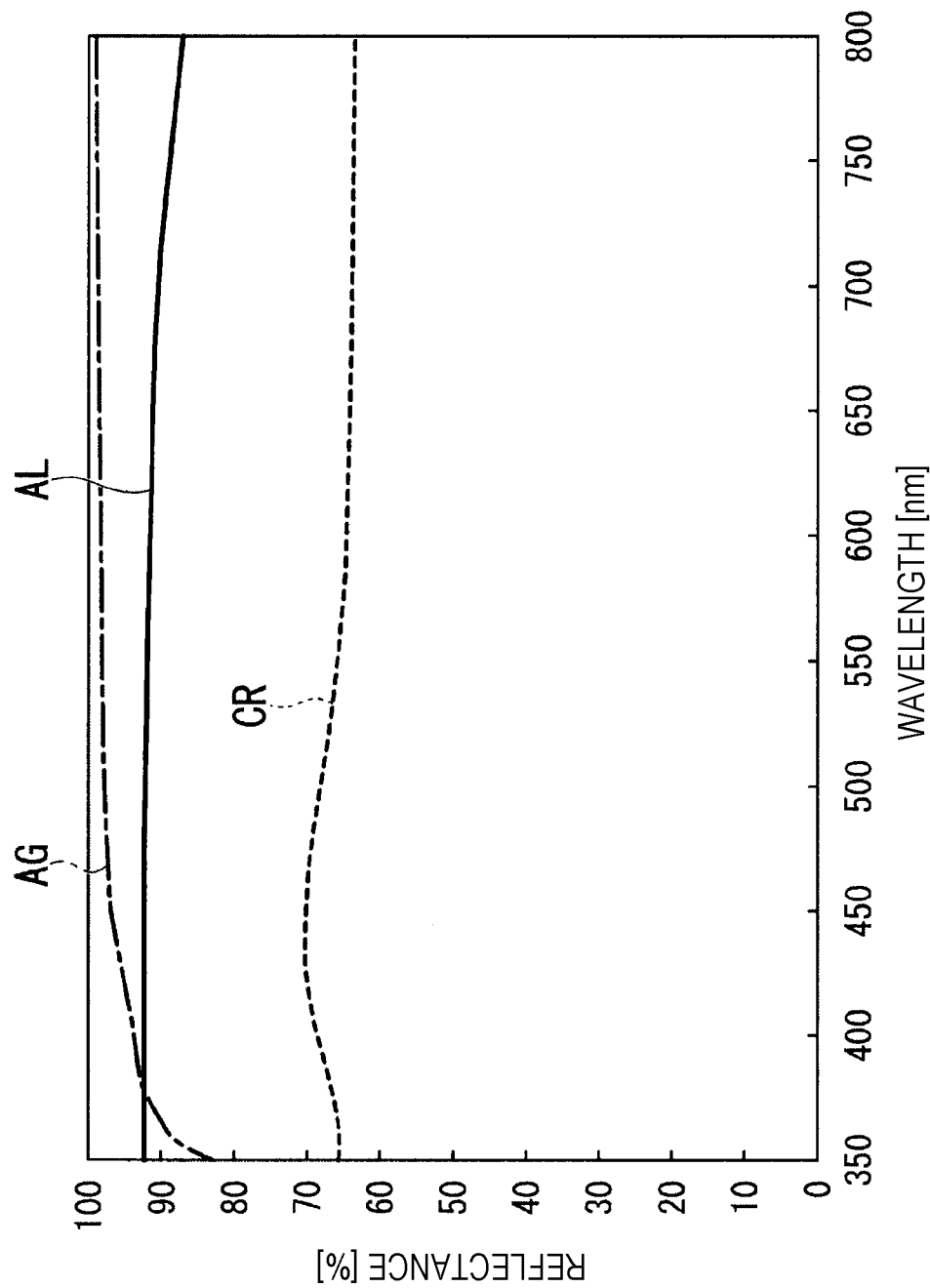
FIG. 5 is a graph illustrating a spectral reflectance of a metal material used for a mirror.

FIG. 5 is a graph illustrating a spectral reflectance of a metal material used for the mirror 31.

In FIG. 5, the horizontal axis denotes a wavelength (nm) and the vertical axis denotes a reflectance (%). The graph of a symbol AG represents the spectral reflectance of silver, the graph of a symbol AL represents the spectral reflectance of aluminum, and the graph of a symbol CR represents the spectral reflectance of chromium.

As illustrated in FIG. 5, silver represents the reflectance of 82 to 99%, aluminum represents the reflectance of 86 to 90%, and chromium represents the reflectance of 63 to 70%, with respect to light having a wavelength of 350 to 800 nm. The optical element in the related art uses, for example, a partially reflecting mirror with the reflectance of approximately 10 to 50% from the viewpoint of transmitting external image and facilitating observation of an external image. In contrast to this, the optical element 30 according to the present embodiment uses the mirror 31 with a higher reflectance than the reflectance of the optical element in the related art. As such, the reflectance of each of the plurality of mirrors 31 is higher than or equal to 60% and lower than 100%.

Hereinafter, an angle between the reflection surface 31r of the mirror 31 and the incidence surface 32a of the transmittance member 32 is defined as an inclination angle δ of the mirror 31. In the present embodiment, the inclination angle δ of the mirror 31 is larger than or equal to 45° and smaller than 90°. In the present embodiment, the refractive index of the transmittance member 32 is equal to the refractive index of the parallel light guiding body 22, and the refractive indices thereof may be different. In a case where the refractive indices are different, it is necessary to change the inclination angle δ of the mirror 31 with respect to a case where the refractive index is equal.

Each of the plurality of mirrors 31 forms an inclination angle δ of, for example, approximately 48° to 70° in a clockwise direction with respect to an observer side surface 22b of the parallel light guiding body 22, specifically, forms, for example, an inclination angle δ of 60°. Here, an elevation angle ϕ0 of the image light GL0 is set to, for example, 30°, the elevation angle ϕ1 of the image light GL1 is set to, for example, 22°, and the elevation angle ϕ2 of the image light GL2 is set to, for example, 38°. In this case, as illustrated in FIG. 3, the image light GL1 and the image light GL2 are incident on the eye EY of an observer at an angle γ1=γ2≈12.5° with respect to the light axis AX.

Thereby, in a case where components (image light GL1) with a relatively large total reflection angle in the image light GL are mainly incident on a portion 23h on the −x side in the exit portion 23, and the components (image light GL2) with a relatively small total reflection angle are mainly incident on a portion 23m on the +x side in the exit portion 23, it is possible to efficiently extract the image light GL at an angle that collects the image light GL as a whole in the eye EY of the observer. That is, it is possible to efficiently extract the image light GL incident at a relatively large incidence angle (relatively small elevation angle) from the parallel light guiding body 22 to the incidence surface 32a of the optical element 30, from the parallel light guiding body 22. Since the optical element 30 is configured to extract the image light GL at such an angle, the light guiding device 20 can make the image light GL pass only one time without making the image light GL pass plural time in the optical element 30 in principle. Thereby, the image light GL can be exited as virtual image light with a small loss.

A pitch PT between the adjacent mirrors 31 is set to approximately 0.5 mm to 2.0 mm. Strictly speaking, the pitches PT between the mirrors 31 are not equally spaced, and are disposed at variable pitches. More specifically, the pitch PT between the mirrors 31 is a random pitch which randomly increases or decreases around a reference interval. As such, by disposing the mirrors 31 at random pitches, occurrence of diffraction unevenness and moire can be suppressed. A predetermined pitch pattern including not only the random pitch but also a pitch that increases and decreases in a plurality of stages may be repeated.

A thickness TI of the optical element 30 is set to approximately 0.7 mm to 3.0 mm. A thickness of the parallel light guiding body 22 supporting the optical element 30 is, for example, approximately several mm to 10 mm, preferably, approximately 4 mm to 6 mm. If the thickness of the parallel light guiding body 22 is sufficiently larger than the thickness of the optical element 30, an incidence angle of the image light GL on the optical element 30 or a boundary IF is easily reduced, and reflection by the mirror 31 at a position where the image light GL is not taken into the eye EY is easily suppressed. Meanwhile, if the thickness of the parallel light guiding body 22 is relatively thin, the weights of the parallel light guiding body 22 and the light guiding device 20 are easily reduced.

An end portion of the transmittance member 32 on a side where an end portion (upper end) on the incidence surface 32a side of the mirror 31 is inclined is referred to as a first end portion 32e, and an end portion of the transmittance member 32 opposite to the first end portion 32e is referred to as a second end portion 32f. The plurality of mirrors 31 include a first mirror 311 and a second mirror 312 which is provided closer to the second end portion 32f than the first mirror 311 and has a narrower width than the first mirror 311. More specifically, in the present embodiment, widths of the plurality of mirrors 31 in all the regions in which the plurality of mirrors 31 are provided are sequentially narrowed from a side (the first end portion 32e side) on which the first mirror 311 is disposed toward a side (the second end portion 32f side) on which the second mirror 312 is disposed. In addition, one end (upper end) of each of the plurality of mirrors 31 is in contact with the incidence surface 32a. In the present specification, a width M of the mirror 31 is defined as a dimension between the upper end and a lower end of the mirror 31 in a thickness direction of the optical element 30. Therefore, a width M2 of the second mirror 312 is narrower than the width M1 of the first mirror 311 (M2<M1). In addition, the width M2 of the second mirror 312 is smaller than the pitch PT between the second mirror 312 and the mirrors 31 adjacent to the second mirror 312.

Operation of Optical Element

Figure 11:
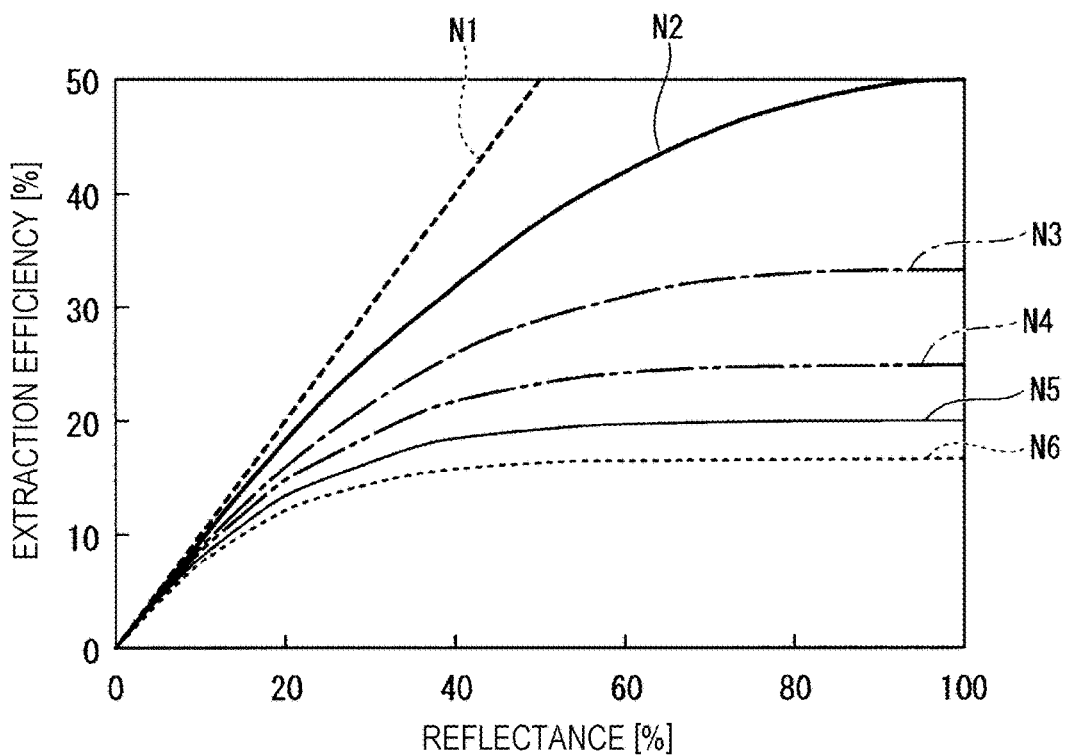
FIG. 11 is a graph illustrating a relationship between a reflectance of a mirror and exit efficiency.

FIG. 11 is a graph illustrating a relationship between the reflectance of the mirror 31 and the exit efficiency of the image light GL.

A horizontal axis of the graphs denotes the reflectance (%), and a vertical axis denotes the exit efficiency (%).

The graph N1 represents a case where the image light GL passes through one mirror 31, the graph N2 represents a case where the image light GL passes through two mirrors 31, the graph N3 represents a case where the image light GL passes through three mirrors 31, the graph N4 represents a case where the image light GL passes through four mirrors 31, the graph N5 represents a case where the image light GL passes through five mirrors 31, and the graph N6 represents a case where the image light GL passes through six mirrors 31.

The number of mirrors 31 through which the image light GL passes changes depending on an incidence angle of the image light GL with respect to the incidence surface 32a of the optical element 30. Specifically, as the incidence angle of the image light GL on the incidence surface 32a of the optical element 30 increases, the number of mirrors 31 through which the image light GL passes increases.

As illustrated in FIG. 11, as the number of mirrors 31 through which the image light GL passes increases, the exit efficiency decreases. However, the exit efficiency increases as the reflectance of the mirror 31 increases, regardless of the number of mirrors 31 through which the image light GL passes, and when the reflectance is set to 100%, the exit efficiency can be maximized. Therefore, in a case where the exit efficiency from the mirror 31 is considered, particularly, the image light GL is incident at a large incidence angle, it is desirable that the reflectance of the mirror 31 be set to 100%.

Here, the present inventor prepares an optical element according to a comparative example including a plurality of mirrors having a constant width, and performed a ray tracing simulation on the optical element according to the comparative example.

In the optical element according to the comparative example, a reflectance of the mirror is 100%, and a pitch between adjacent mirrors of the plurality of mirrors is smaller than a width of the mirror.

Figure 10:
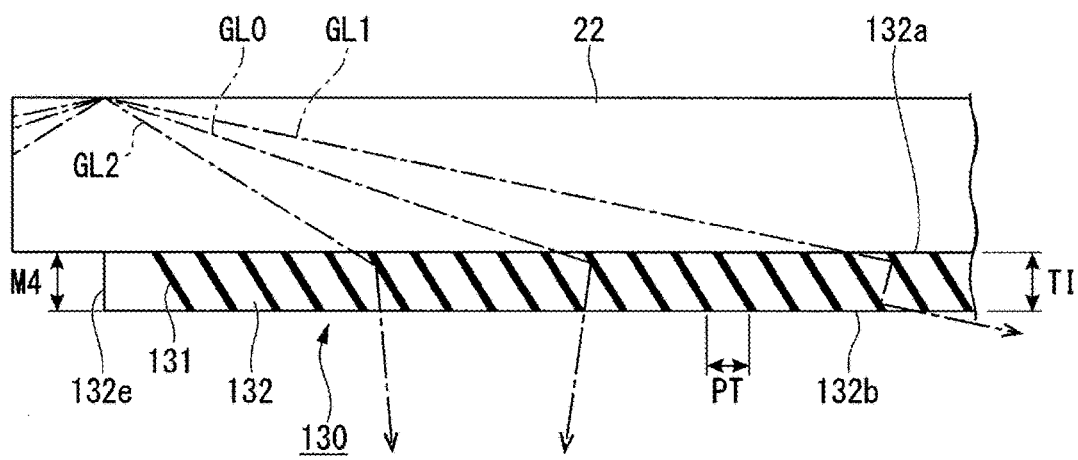
FIG. 10 is a sectional view of the optical element according to a comparative example.

FIG. 10 is a sectional view of the optical element 130 according to a comparative example.

As illustrated in FIG. 10, in an optical element 130 according to the comparative example, widths M4 of the plurality of mirrors 131 are constant, and the widths M4 of the plurality of mirrors 131 are equal to the thickness TI of the optical element 130. In this case, the image light GL2 incident at a relatively small incidence angle on an incidence surface 132a of the optical element 130 is reflected by the mirror 131 on the side close to a first end portion 132e and is exited from an exit surface 132b.

In contrast to this, the image light GL1 incident at a relatively large incidence angle on the incidence surface 132a of the optical element 130 is reflected by the mirror 131 farther from the first end portion 132e, but is reflected by the adjacent mirror 131 again and proceeds in a direction different from the other image lights GL0 and GL2. As such, the image light GL1 is blocked by the adjacent mirror 131 after being reflected by one mirror 131 and is not guided in a direction of the eye EY of an observer.

Figure 12:
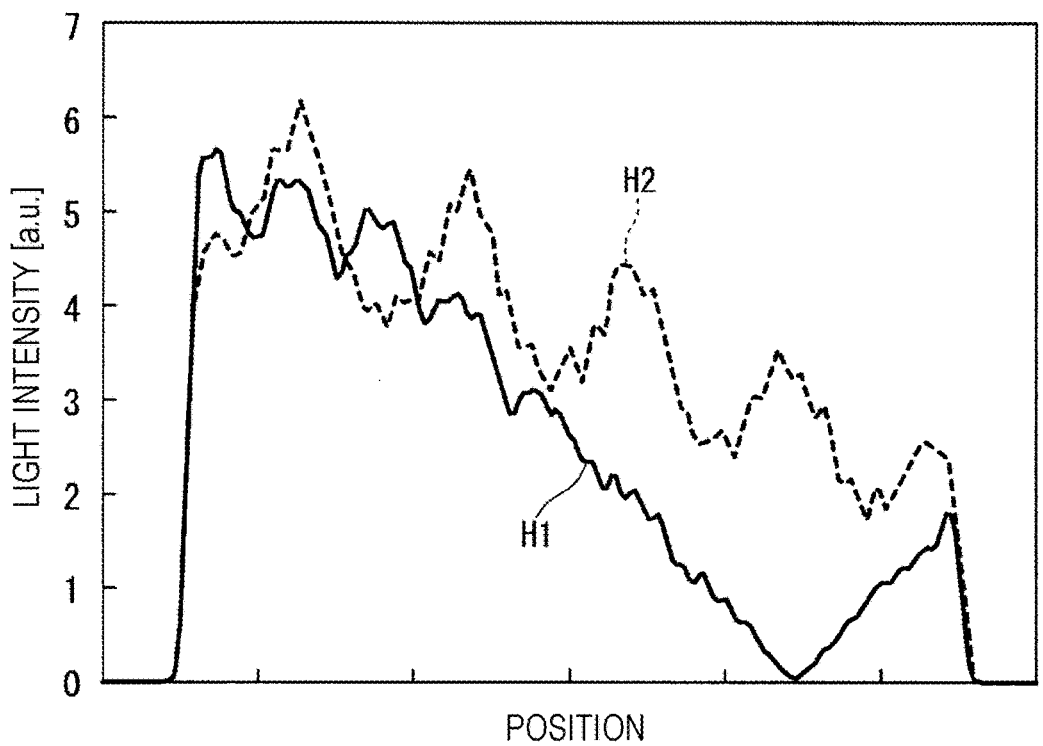
FIG. 12 is a graph illustrating a brightness profile of an image in the optical element according to the comparative example.

FIG. 12 is a graph illustrating a brightness profile when a white image is displayed on the entire surface of the optical element 130 according to the comparative example.

A horizontal axis of the graph denotes a position in the image, and a vertical axis denotes intensity (relative value) of the image light.

As illustrated in the graph of a symbol H1 of FIG. 12, in the optical element 130 of the comparative example, light intensity at a specific position in an image is extremely lowered, that is, a dark portion is generated in which the light intensity is remarkably lowered. This is due to the fact that the image light GL1 incident at a relatively large incidence angle on the incidence surface 132a of the optical element 130 is not guided in a direction of the eye EY of an observer, as illustrated in FIG. 10.

A phenomenon in which, although the image light GL1 is reflected by one mirror 131, the image light is blocked by the adjacent mirror 131 and is not guided in the direction of the eye EY of the observer to can be improved by widening the pitch PT between the mirrors 131. However, it is found that, in a case where the pitch PT between the mirrors 131 is widened, occurrence of the dark portion is improved as represented by the graph of a symbol H2 in FIG. 12, but the light intensity periodically increases and decreases and bright and dark striped brightness unevenness is generated depending on a position in the optical element 130.

In contrast to this, according to the optical element 30 of the present embodiment, the following operations and effects are obtained.

As illustrated in FIG. 4, in the optical element 30 according to the present embodiment, the image light GL2 incident at a relatively small incidence angle on the incidence surface 32a is reflected by the mirror 31 close to the first end portion 32e, and is exited from the exit surface 32b. In addition, the image light GL1 incident at a relatively large incidence angle on the incidence surface 32a is reflected by the mirror 31 far from the first end portion 32e, and is exited from the exit surface 32b. That is, in the optical element 30 according to the present embodiment, unlike the optical element 130 according to the comparative example, the width of the mirror 31 far from the first end portion 32e is narrower than the width of the mirror 31 close to the first end portion 32e and the image light GL1 reflected by one mirror 31 is hard to be blocked by the adjacent mirror 31.

The inventor performed a ray tracing simulation to obtain a distribution of the exited light in the display device using the optical element 30 according to the present embodiment.

As an example of the width of the mirror 31 of the ray tracing simulation, the width M1 of the leftmost first mirror 311 in FIG. 4 is 57% of the thickness TI of the optical element 30. The width M2 of the rightmost second mirror 312 in FIG. 4 is 14% of the thickness TI of the optical element 30. A reflectance of each mirror 31 is 100%.

Here, since transmittance of the external image EL depends on an area of the mirror 31 included in the transmittance member 32, the transmittance changes depending on a position of the eye EY. A simulation was performed for the optical element 30 according to the present embodiment including the mirror 31 having the aforementioned width at a position of the eye EY illustrated in FIG. 3, and as a result, the transmittance of the external image EL is 71%.

Figure 6:
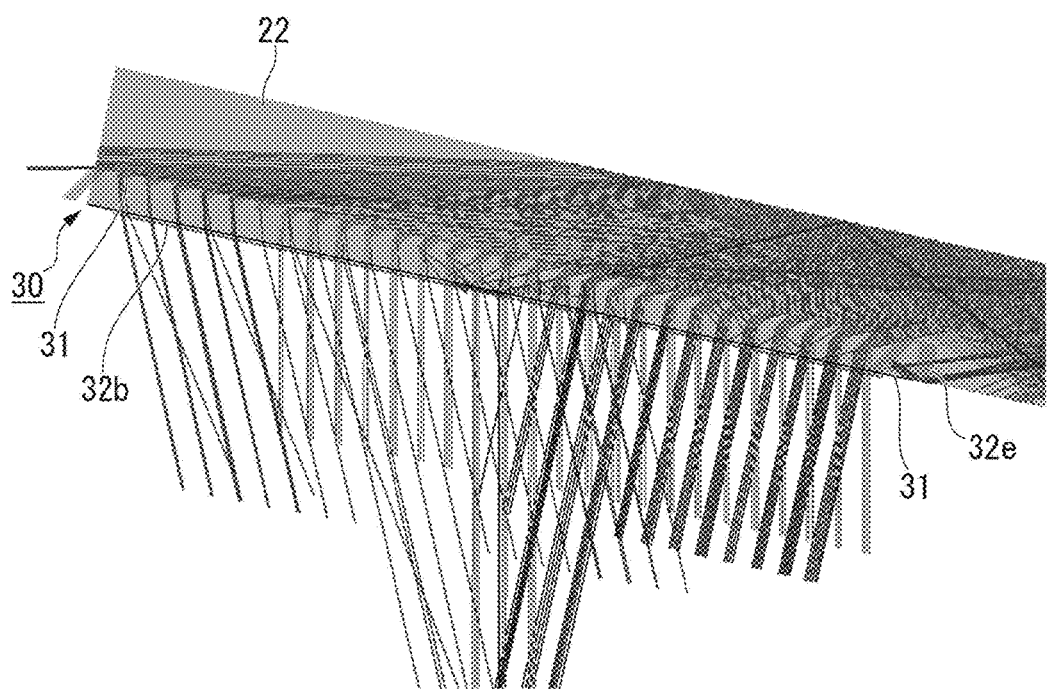
FIG. 6 is a view illustrating a result of a ray tracing simulation of an exited light distribution.

FIG. 6 is a view illustrating a result of the ray tracing simulation of the exited light distribution.

As illustrated in FIG. 6, it is found that not only the image light GL reflected by the mirror 31 on a side close to the first end portion 32e but also the image light GL reflected by the mirror 31 far from the first end portion 32e are exited from the exit surface 32b and are guided in a direction of the eye EY of an observer.

Figure 7:
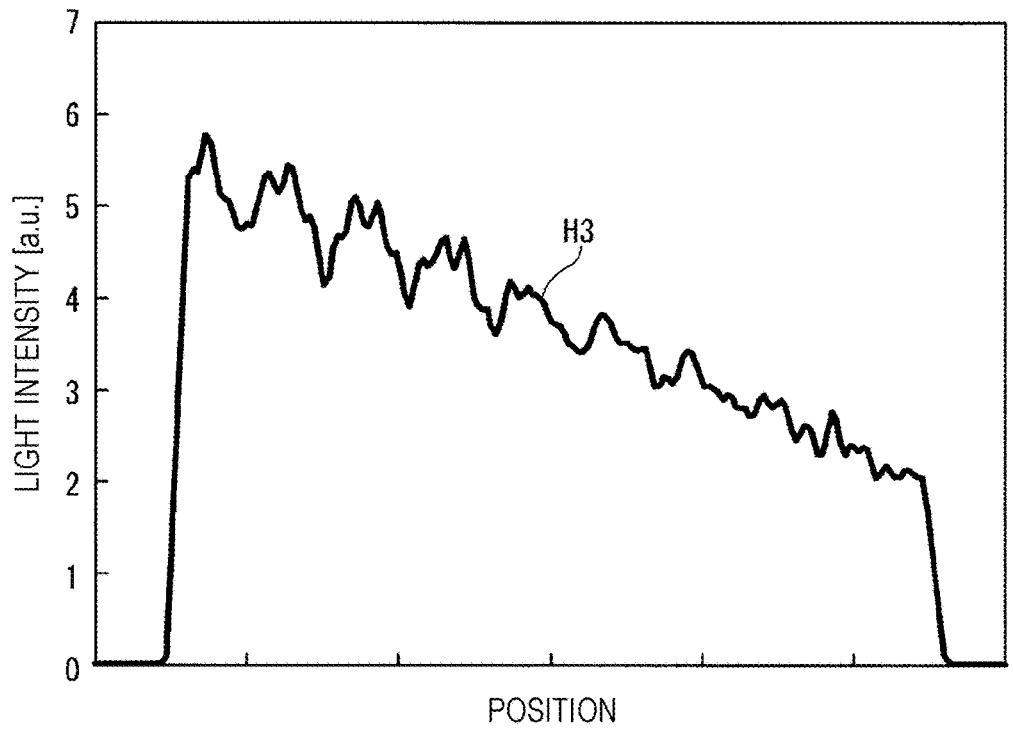
FIG. 7 is a graph illustrating a brightness profile of an image in the optical element according to the first embodiment.

FIG. 7 is a graph illustrating a brightness profile when a white image is displayed on the entire surface of the display device 100 using the optical element 30 according to the present embodiment.

A horizontal axis of the graph denotes a position in the image, and a vertical axis denotes intensity (relative value) of the image light.

As illustrated in FIG. 7, periodic increase and decrease of the light intensity are repeated depending on the position in the optical element 30, but a variation width of the light intensity is smaller than a variation width of the graph of a symbol H2 in FIG. 12. As such, according to the optical element 30 of the present embodiment, it is confirmed that bright and dark striped brightness unevenness is improved and brightness unevenness is hard to be viewed to the observer.

Figure 8:
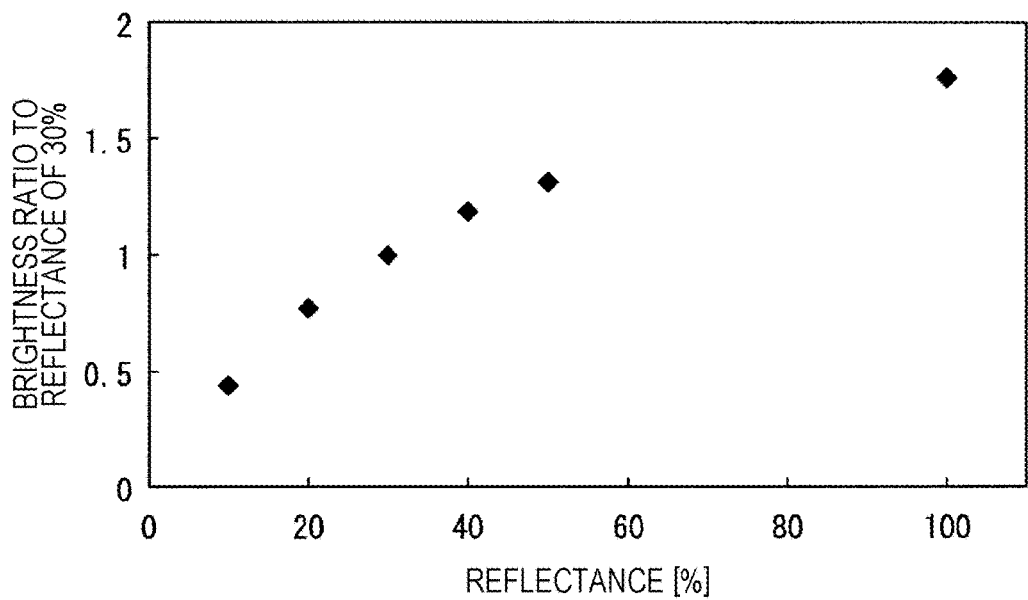
FIG. 8 is a graph illustrating a relationship between a reflectance of a mirror and brightness of the image.

FIG. 8 is a graph illustrating a relationship between the reflectance of the mirror 31 and the brightness of the image.

A horizontal axis of the graph denotes the reflectance (%), and a vertical axis denotes a ratio of the brightness of the image when the brightness of the image is set to 1 when the reflectance of the mirror is set to 30%. That is, since brightness of an image is proportional to luminance of a display panel, the brightness of the image at each point is normalized with reference to the brightness of the image when the reflectance of the mirror is 30% in the optical element according to the comparative example in which the width of the mirror is constant.

Each point in which the reflectance is 10%, 20%, 30%, 40%, and 50% among six points in the graph indicates a brightness ratio of the optical element 130 according to the comparative example, and a point in which the reflectance is 100% indicates the brightness ratio of the optical element 30 according to the present embodiment.

In the optical element 130 according to the comparative example, transmittance of the external image EL is determined only by the reflectance of the mirror 131. Accordingly, in order to set the transmittance of the external image EL to 70%, the reflectance of the mirror 131 has to be set to 30%. In contrast to this, in the optical element 30 according to the present embodiment, when the reflectance is 100%, the transmittance of the external image EL is 71% and the brightness ratio is 1.8 as described above. That is, according to the optical element 30 of the present embodiment, when the transmittance of the external image EL is equal to the transmittance of the optical element 130 according to the comparative example, it is possible to obtain an image with brightness of approximately 1.8 times the brightness of the optical element 130 according to the comparative example.

As such, according to the display device 100 using the optical element 30 of the present embodiment, it is possible to obtain a bright image while improving dark portions and striped brightness unevenness of the image. In addition, the first transmittance member 321 and the second transmittance member 322 are integrally formed and have the same refractive index, and the exit surface 32b and the incidence surface 32a are parallel to each other. Accordingly, there is no boundary with different refractive indices between the first transmittance member 321 and the second transmittance member 322, and bending of a light path of the external image can be substantially removed. As a result, it is possible to reduce enlargement of the external image, focus shift, and the like.

Hereinafter, an example of a method of manufacturing the optical element 30 according to the present embodiment will be described.

Figure 9A:
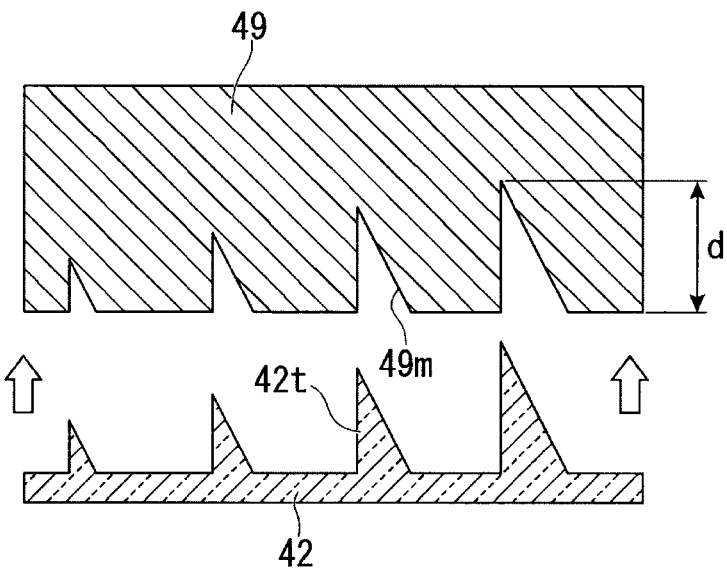
FIG. 9A is a view illustrating one step of a manufacturing process of the optical element.
Figure 9B:
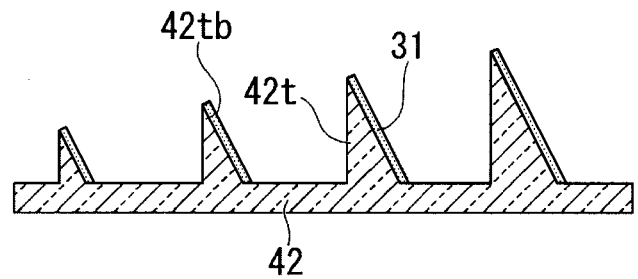
FIG. 9B is a view illustrating continuation of FIG. 9A.
Figure 9C:
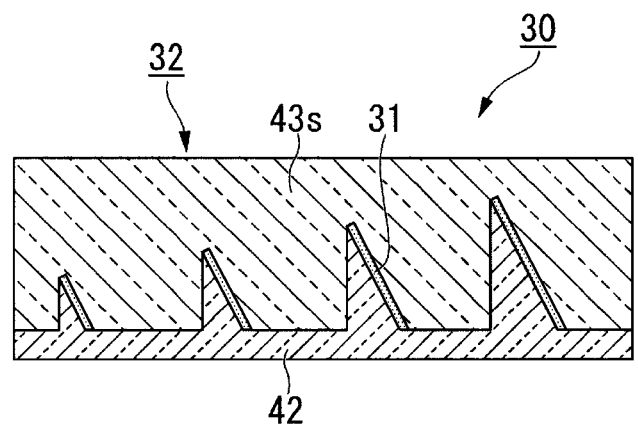
FIG. 9C is a view illustrating continuation of FIG. 9B.

FIGS. 9A to 9C are views illustrating each step of a manufacturing process of the optical element 30.

As illustrated in FIG. 9A, a mold 49 having a plurality of grooves 49m whose sectional shape is recessed in a wedge shape is prepared. At this time, depths d of the plurality of grooves 49m are sequentially deepened from one direction to the other direction of arrangement directions of the grooves 49m. By transcribing a shape of the mold 49 into a plate body formed of a resin material, a transmittance member 42 having a plurality of protrusions 42t whose sectional shape protrudes in a wedge shape is produced.

Next, as illustrated in FIG. 9B, a metal film such as silver, aluminum, chromium or the like is formed on the inclined surface 42tb of the protrusion 42t to form the mirror 31. At this time, the metal film may be selectively formed on the inclined surface 42tb of the protrusion 42t by using a mask or the like.

Next, as illustrated in FIG. 9C, a resin material is supplied on a surface of the transmittance member 42 on the side where the protrusions 42t are formed, and the protrusions 42t are buried. In this state, the resin material is cured to form a resin layer 43s, and thereby, the optical element 30 according to the present embodiment is completed in which a plurality of mirrors 31 having different widths are formed inside the transmittance member 32.

It is desirable that a resin material with the same refractive index as the resin material used in the step of FIG. 9A be used as the resin material used in the step of FIG. 9C, but a resin material with a different refractive index from the resin material used in the step of FIG. 9A may be used. In addition, a resin material is not required to be used necessarily as the transmittance member 32, and, for example, glass or the like may be used. Alternatively, a resin material and glass may be combined.

Second Embodiment

Hereinafter, a second embodiment will be described with reference to FIG. 13.

A basic configuration of a display device according to the second embodiment is the same as the configuration according to the first embodiment, and a configuration of an optical element is different from the configuration according to the first embodiment. Therefore, description of the display device will be omitted, and the optical element will be described.

Figure 13:
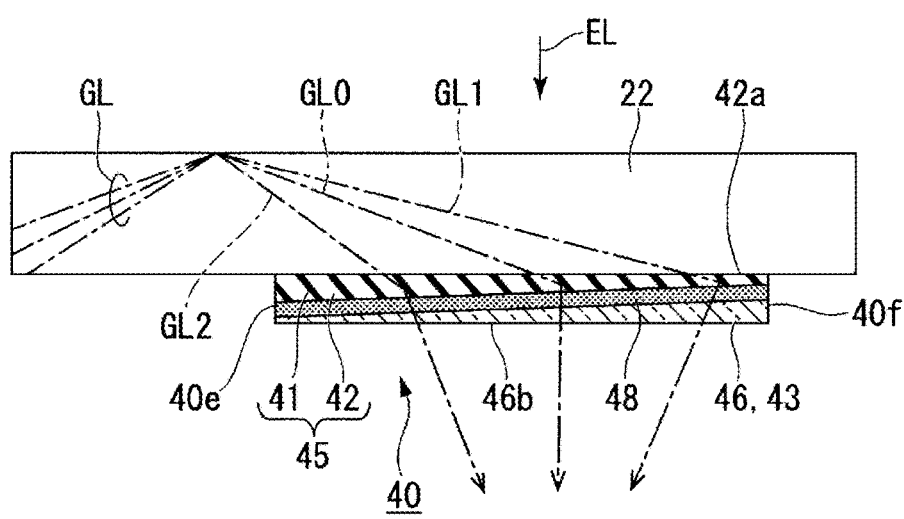
FIG. 13 is a sectional view of an optical element according to a second embodiment.

FIG. 13 is a sectional view of the optical element according to the second embodiment.

In FIG. 13, the same reference numerals or symbols are attached to configuration elements common to the drawings used in the first embodiment, and description thereof is omitted.

In the optical element 30 according to the first embodiment, a first transmittance member 321 interposed between adjacent two mirrors 31 of the transmittance members 32, and a second transmittance member 322 covering lower ends of the plurality of mirrors 31 are integrally formed. In contrast to this, in an optical element 40 according to the second embodiment, a first transmittance member 42 interposed between adjacent two mirrors 41 of the transmittance members, and a second transmittance member 43 provided on an exit side of the image light GL and the external image EL with respect to the first transmittance member 42 are separately formed, as illustrated in FIG. 13. Hereinafter, a portion configured by the plurality of mirrors 41 and the first transmittance member 42 is referred to as a reflection member 45, and the second transmittance member 43 which is provided on an exit side of the reflection member 45 and covers the lower ends of the plurality of mirrors 41 is referred to as a cover member 46. That is, the optical element 40 according to the second embodiment includes the reflection member 45 and the cover member 46.

The reflection member 45 includes a plurality of mirrors 41 and a plurality of first transmittance members 42 interposed between adjacent two mirrors 41. In the same manner as the first embodiment, widths of the plurality of mirrors 41 are sequentially narrowed from a first end portion 40e toward a second end portion 40f. In addition, a reflectance of each of the plurality of mirrors 41 is higher than or equal to 60% and lower than 100%. Each of the first transmittance members 42 is a columnar member having a substantially parallelogram sectional shape. One surface of each of the first transmittance members 42 is an incidence surface 42a on which the image light GL and the external image EL are incident. That is, a surface of the first transmittance member 42 opposite to the second transmittance member 43 is the incidence surface 42a on which the image light GL and the external image EL are incident.

The cover member 46 is configured by a second transmittance member 43 having a wedge-shaped cross section. The cover member 46 And is fixed via an optical adhesive 48, such that a thicker side of the cover member 46 overlaps a thinner side of the reflection member 45 and a side where a plate thickness of the cover member 46 is thinner overlaps a side where the plate thickness of the reflection member 45. A flat surface of the cover member 46 on an observer side is an exit surface 46b from which the image light GL and the external image EL are exited. That is, a surface of the second transmittance member 43 opposite to the first transmittance member 42 is the exit surface 46b from which the image light GL and the external image EL are exited toward the observer side.

The first transmittance member 42 of the reflection member 45 and the second transmittance member 43 configuring the cover member 46 may be formed of the same material with the same refractive index or may be formed of materials with different refractive indices.

In a case where a material with the same refractive index is used for the first transmittance member 42 and the second transmittance member 43, the incidence surface 42a and the exit surface 46b of the image light GL and the external image EL are formed in parallel. Thereby, it is possible to remove bending of the light path of the external image EL, and to reduce enlargement of an external image, focus shift and the like.

Alternatively, in a case where materials having different refractive indices are used for the first transmittance member 42 and the second transmittance member 43, the exit surface 46b of the image light GL and the external image EL is formed so as to be inclined with respect to the incidence surface 42a. In this case, a light path of the external image EL is bent at a boundary between the first transmittance member 42 and the second transmittance member 43 which have different refractive indices. However, by appropriately adjusting an inclination angle of the exit surface 46b with respect to the incidence surface 42a, it is possible to compensate for bending of the light path of the external image EL. Thereby, it is possible to reduce bending of the light path of the external image EL, and to reduce enlargement of an external image, focus shift, and the like.

The optical element 40 is fixed to the parallel light guiding body 22 such that the reflection member 45 faces the parallel light guiding body 22 side and the cover member 46 faces an observer side. Thereby, one end of each of the plurality of mirrors 41 is in contact with the incidence surface 42a.

When the optical element 40 according to the present embodiment is manufactured, for example, the reflection member 45 is manufactured by cutting a stacking body such that a cross section thereof has a wedge shape, after the stacking body is manufactured in which the first transmittance member 42 and the mirror 41 are alternately laminated, instead of the manufacturing method described in the first embodiment. Separately, the cover member 46 having a cross section of a wedge shape is manufactured, and the optical element 40 can be manufactured by adhering the reflective member 45 and the cover member 46 to an optical adhesive 48. An adhesive with the same refractive index as at least one of the first transmittance member 42 and the second transmittance member 43 is used as the optical adhesive 48.

According to the optical element 40 of the present embodiment, it is possible to obtain the same effects as the first embodiment in which a display device capable of obtaining a bright image while improving a dark portion and striped brightness unevenness of an image can be realized, and enlargement of an external image, focus shift, and the like can be reduced.

When the optical element 40 according to the present embodiment is manufactured, the reflection member 45 configured with the plurality of mirrors 41 and the plurality of first transmittance members 42, and the cover member 46 configured with the second transmittance member 43 can be separately produced. Thereby, the optical element 40 can be easily manufactured. Particularly, since the second transmittance member 43 is easily manufactured, bending of the light path of the external image EL can be easily compensated for.

Third Embodiment

Hereinafter, a third embodiment will be described with reference to FIG. 14.

A basic configuration of a display device according to the third embodiment is the same as the configuration of the first embodiment, and a configuration of an optical element is different from the configuration of the first embodiment. Therefore, description of the display device is omitted, and the optical element will be described.

Figure 14:
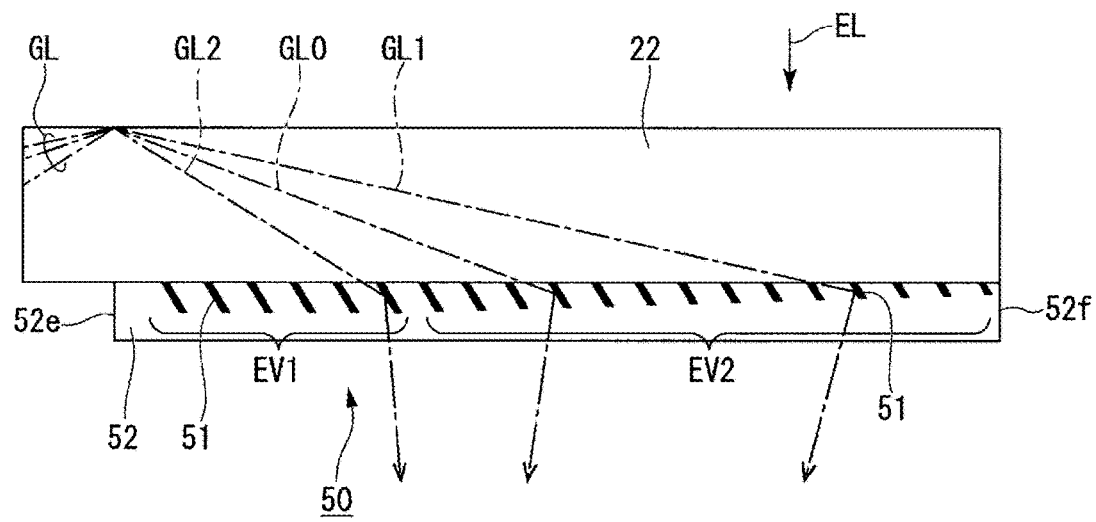
FIG. 14 is a sectional view of an optical element according to a third embodiment.

FIG. 14 is a sectional view of an optical element 50 according to the third embodiment.

In FIG. 14, the same reference numerals or symbols are attached to configuration elements common to the drawings used in the first embodiment, and description thereof is omitted.

In the optical element 30 according to the first embodiment, widths of the plurality of mirrors 31 are sequentially narrowed from the first end portion 32e toward the second end portion 32f. In contrast to this, in the optical element 50 according to the third embodiment, the widths of the plurality of mirrors 51 are not monotonously narrowed from a first end portion 52e of the transmittance member 52 toward a second end portion 52f, as illustrated in FIG. 14.

That is, widths of the plurality of mirrors 51 belonging to a region denoted by a symbol EV1 among the plurality of mirrors 51 are the same as each other. In a region denoted by a symbol EV2, widths of the mirrors 51 are sequentially narrowed from the mirror 51 on the right end (second end portion side) toward the mirror 51 on the left end. In other words, in the region EV2, the widths of the mirror 51 are widened from the mirror 51 at the right end to the mirror 51 on the left end at a constant rate, and if a mirror having a widened width is used as the ratio of the region EV2 is maintained in the region EV1, a width of the actual mirror 51 is narrower than a width of a virtual mirror. The other configuration is the same as the configuration of the first embodiment.

According to the optical element 50 of the present embodiment, it is possible to obtain the same effects as the first and second embodiments in which a display device capable of obtaining a bright image while improving a dark portion and striped brightness unevenness of an image can be realized, and enlargement of an external image, focus shift, and the like can be reduced.

Although the image light is extracted with high efficiency in a region on a side where a width of a mirror is wide, an external image is incident from a direction nearly perpendicular on an incidence surface, and thereby, the light is blocked by a wide mirror, is hard to pass through, and is difficult to be extracted with high efficiency. On that point, according to the optical element 50 of the present embodiment, since the widths of the plurality of mirrors 51 in the region EV1 are the same and are narrower than a width of the aforementioned virtual mirror, the transmittance of the external image EL can be increased. Thereby, according to the optical element 50 of the present embodiment, it is possible to view a bright external image.

Fourth Embodiment

Hereinafter, a fourth embodiment will be described with reference to FIGS. 15 and 16.

A basic configuration of a display device according to the fourth embodiment is the same as the configuration of the first embodiment, and a configuration of an optical element is different from the configuration of the first embodiment. Therefore, description of the display device is omitted, and the optical element will be described.

Figure 15:
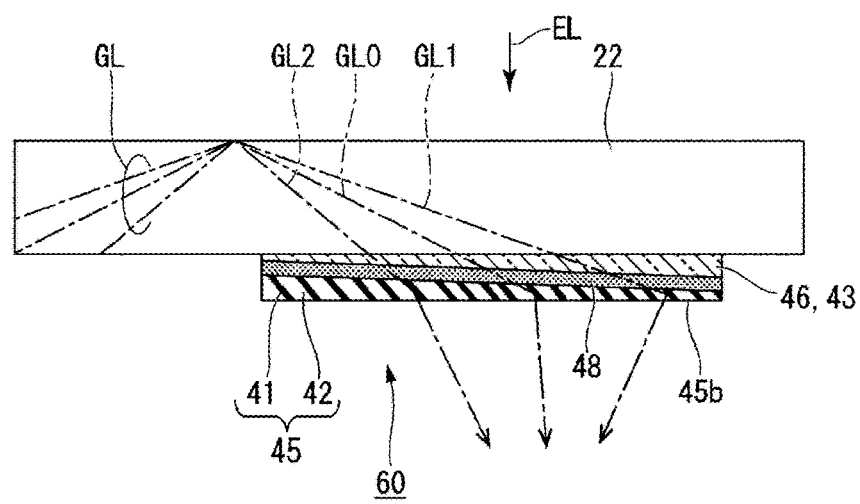
FIG. 15 is a sectional view of an optical element according to a fourth embodiment.

FIG. 15 is a sectional view of an optical element 60 of according to the fourth embodiment.

In FIG. 15, the same reference numerals or symbols are attached to configuration elements common to the drawings used in the first embodiment, and description thereof is omitted.

As illustrated in FIG. 15, the optical element 60 according to the fourth embodiment includes the reflection member 45 and the cover member 46 in the same manner as the optical element 40 according to the second embodiment. In the optical element 60 according to the fourth embodiment, the second transmittance member 43 configuring the cover member 46 is provided on an incidence side of the image light GL and the external image EL with respect to the first transmittance member 42. That is, in contrast to the optical element 40 according to the second embodiment, the optical element 60 is fixed to the parallel light guiding body 22 such that the cover member 46 faces the parallel light guiding body 22 side and the reflection member 45 faces an observer side. Thereby, one end of each of the plurality of mirrors 41 is in contact with an exit surface 45b. The other configurations are the same as in the first embodiment.

According to the optical element 60 of the present embodiment, it is possible to obtain the same effects as the first to third embodiments in which a display device capable of obtaining a bright image while improving a dark portion of and striped brightness unevenness of an image can be realized, and enlargement of an external image, focus shift, and the like can be reduced.

The inventor performed a ray tracing simulation to demonstrate the effects of the optical element 60 according to the fourth embodiment.

Figure 16:
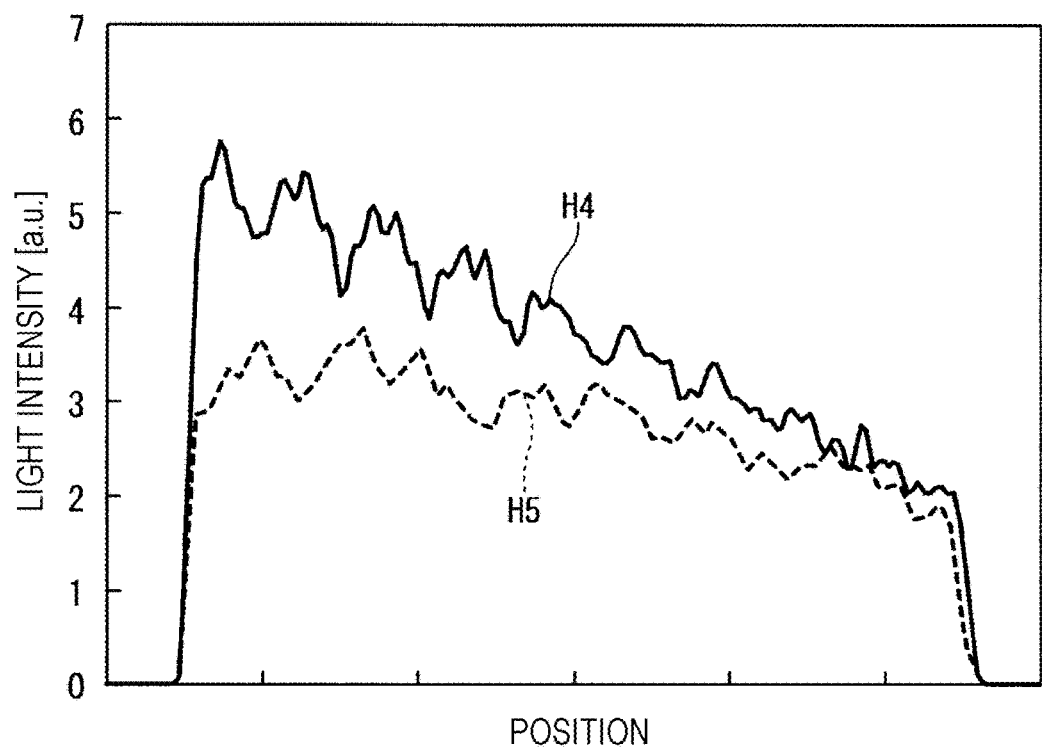
FIG. 16 is a graph illustrating a brightness profile of an image in the optical element according to the fourth embodiment.

FIG. 16 is a graph illustrating a brightness profile when a white image is displayed on the entire surface in the display device using the optical element 60 according to the fourth embodiment.

A horizontal axis of the graph denotes a position in the image, and a vertical axis denotes intensity (relative value) of an image light. The graph of a symbol H4 represents simulation results of the optical element 40 according to the second embodiment and the graph of a symbol H5 represents simulation results of the optical element 60 according to the fourth embodiment.

As illustrated in FIG. 16, it is confirmed that, also in the optical element 60 according to the fourth embodiment, bright and dark striped brightness unevenness is improved and the brightness unevenness is hard to be viewed by an observer, compared with the optical element 130 according to the comparative example illustrated in the graph of the symbol H2 of FIG. 12. In addition, it is confirmed that light intensity slightly decreases and the uniformity of brightness by a position is improved in the optical element 60 according to the fourth embodiment denoted by the graph of the symbol H5, compared with the optical element 40 according to the second embodiment denoted by the graph of the symbol H4.

The technical scope of the disclosure is not limited to the aforementioned embodiments, and various modifications can be made in a range without departing from the gist of the disclosure.

For example, In the above embodiments, an example in which widths of mirrors are sequentially narrowed from one mirror to another mirror over a plurality of mirrors configuring an optical element, or an example in which the widths of the mirrors are sequentially narrowed from one to the other as a whole but the widths are constant in some regions, are used, but a region where the widths are widened reversely may be partially included. In addition, it is also possible to appropriately combine the configurations of the respective embodiments. For example, in the configuration in which a second transmittance member is provided on an incidence side of an image light and an external image with respect to the first transmittance member, the second transmittance member and the first transmittance member may be integrally formed.

Besides, specific configurations of each portion such as the number, shapes, materials, and the like of each configuration element included in the optical element and the display device are not limited to the above embodiments, and can be appropriately changed. For example, a liquid crystal display element, a combination of a laser light source and a MEMS scanner, or the like may be used as an image forming device in addition to the aforementioned organic EL element.

The entire disclosure of Japanese Patent Application No. 2016-189249, filed Sep. 28, 2016 is expressly incorporated by reference herein.

What is claimed is:

1. An optical element comprising:
   a plurality of mirrors that are provided in parallel to each other with an interval therebetween and reflect a part of image light and external image;
   a first transmittance member that is interposed between adjacent two mirrors of the plurality of mirrors; and
   a second transmittance member that is provided on one of an incidence side and an exit side of the image light and the external image with respect to the first transmittance member,
   wherein a surface of one transmittance member opposite to the other transmittance member among the first transmittance member and the second transmittance member is an incidence surface on which the image light and the external image are incident via a light guiding body,
   wherein a surface of the other transmittance member opposite to the one transmittance member is an exit surface from which the image light and the external image are exited to an observer side,
   wherein each of the plurality of mirrors is disposed so as to be inclined with respect to the incidence surface, and
   wherein the plurality of mirrors include a first mirror and a second mirror whose width is narrower than a width of the first mirror.

2. The optical element according to claim 1, wherein widths of the plurality of mirrors that belong to at least a part of an entire region which is provided with the plurality of mirrors are sequentially narrowed from a side on which the first mirror is disposed toward a side on which the second mirror is disposed.

3. The optical element according to claim 1,
   wherein the second transmittance member is provided on an exit side of the image light and the external image with respect to the first transmittance member, and
   wherein one end of each of the plurality of mirrors is in contact with the incidence surface.

4. The optical element according to claim 1,
   wherein the second transmittance member is provided on an incidence side of the image light and the external image with respect to the first transmittance member, and
   wherein one end of each of the plurality of mirrors is in contact with the exit surface.

5. The optical element according to claim 1, wherein the first transmittance member is integrally formed with the second transmittance member.

6. The optical element according to claim 1, wherein the first transmittance member is separately formed from the second transmittance member.

7. The optical element according to claim 1,
   wherein the first transmittance member has the same refractive index as the second transmittance member, and
   wherein the exit surface is parallel to the incidence surface.

8. The optical element according to claim 1,
   wherein the first transmittance member has different refractive index from the second transmittance member, and
   wherein the exit surface is inclined with respect to the incidence surface.

9. The optical element according to claim 1, wherein a reflectance of each of the plurality of mirrors is higher than or equal to 60% and is lower than 100%.

10. The optical element according to claim 9, wherein each of the plurality of mirrors is formed of a metal material.

11. The optical element according to claim 1, wherein a width of the second mirror is smaller than a pitch between a mirror adjacent to the second mirror and the second mirror.

12. A display device comprising:
    an image forming device; and
    a light guiding device that guides image light that is generated by the image forming device,
    wherein the light guiding device includes an incidence portion on which the image light is incident, a light guiding body that guides the image light which is incident from the incidence portion, and an exit portion from which the image light is exited, and
    wherein the exit portion includes the optical element according to claim 1.

13. A display device comprising:
    an image forming device; and
    a light guiding device that guides image light that is generated by the image forming device,
    wherein the light guiding device includes an incidence portion on which the image light is incident, a light guiding body that guides the image light which is incident from the incidence portion, and an exit portion from which the image light is exited, and
    wherein the exit portion includes the optical element according to claim 2.

14. A display device comprising:
    an image forming device; and
    a light guiding device that guides image light that is generated by the image forming device,
    wherein the light guiding device includes an incidence portion on which the image light is incident, a light guiding body that guides the image light which is incident from the incidence portion, and an exit portion from which the image light is exited, and
    wherein the exit portion includes the optical element according to claim 3.

15. A display device comprising:
    an image forming device; and
    a light guiding device that guides image light that is generated by the image forming device,
    wherein the light guiding device includes an incidence portion on which the image light is incident, a light guiding body that guides the image light which is incident from the incidence portion, and an exit portion from which the image light is exited, and
    wherein the exit portion includes the optical element according to claim 4.

16. A display device comprising:
    an image forming device; and
    a light guiding device that guides image light that is generated by the image forming device,
    wherein the light guiding device includes an incidence portion on which the image light is incident, a light guiding body that guides the image light which is incident from the incidence portion, and an exit portion from which the image light is exited, and
    wherein the exit portion includes the optical element according to claim 5.

17. A display device comprising:
    an image forming device; and
    a light guiding device that guides image light that is generated by the image forming device,
    wherein the light guiding device includes an incidence portion on which the image light is incident, a light guiding body that guides the image light which is incident from the incidence portion, and an exit portion from which the image light is exited, and wherein the exit portion includes the optical element according to claim 6.

18. A display device comprising:

an image forming device; and a light guiding device that guides image light that is generated by the image forming device, wherein the light guiding device includes an incidence portion on which the image light is incident, a light guiding body that guides the image light which is incident from the incidence portion, and an exit portion from which the image light is exited, and wherein the exit portion includes the optical element according to claim 7.

19. The display device according to claim 12, wherein the exit portion is provided on a surface on a viewing side of the light guiding body.

20. The display device according to claim 12, wherein each of the plurality of mirrors is inclined such that an end portion of a side of the incidence surface approaches the incidence portion side of the light guiding device.

\* \* \* \* \*